United States Patent
Kuo et al.

(10) Patent No.: US 6,707,505 B2
(45) Date of Patent: *Mar. 16, 2004

(54) METHOD AND APPARATUS FOR COMBINING VIDEO AND GRAPHICS

(75) Inventors: Jhi-Chung Kuo, Saratoga, CA (US); John Francis McNally, Cupertino, CA (US); Jeff Jang-Fang Suen, San Jose, CA (US); Henry Choy, Cupertino, CA (US); Paul Cheng, Fremont, CA (US); Lin Liang, Montain View, CA (US)

(73) Assignee: TVIA, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 255 days.

(21) Appl. No.: 09/276,878

(22) Filed: Mar. 26, 1999

(65) Prior Publication Data

US 2002/0047931 A1 Apr. 25, 2002

(51) Int. Cl.$^7$ ................................................. H04N 9/74
(52) U.S. Cl. ........................ 348/584; 348/589; 348/598; 348/391; 348/600
(58) Field of Search ................................. 348/584, 586, 348/588, 589, 598, 600, 447; 345/113, 114, 115, 133; H04N 9/74, 9/76

(56) References Cited

U.S. PATENT DOCUMENTS

| | | | | |
|---|---|---|---|---|
| 4,580,165 A | * | 4/1986 | Patton et al. | 348/589 |
| 5,793,427 A | * | 8/1998 | Mills et al. | 348/391 |
| 5,923,385 A | * | 7/1999 | Mills et al. | 348/715 |
| 5,926,647 A | * | 7/1999 | Adams et al. | 345/199 |
| 5,953,691 A | * | 9/1999 | Mills | 348/391 |
| 6,014,176 A | * | 1/2000 | Nayebi et al. | 348/584 |
| 6,014,178 A | * | 1/2000 | Jeon et al. | 348/554 |

* cited by examiner

*Primary Examiner*—John Miller
*Assistant Examiner*—Trang U. Tran
(74) *Attorney, Agent, or Firm*—Stephen L. King

(57) ABSTRACT

A single chip system including a first input channel for receiving digital video input data, a second channel for receiving computer graphics data, means for synchronizing the two channels to one another utilizing timing signals which may be selected to provide the most accurate timing available, means for changing the rate of presentation of the computer graphics signals to match the rate of presentation of the video signals, means for adjusting the format in which the computer graphics signals are presented to the same format as the format in which the video signals are presented, and means for selectively blending the computer graphics and video signals furnished as video input data without modification for presentation on a single output display.

1 Claim, 2 Drawing Sheets

METHOD AND APPARATUS FOR COMBINING VIDEO AND GRAPHICS

BACKGROUND OF THE INVENTION

1. Field of the Invention

This invention relates to computer systems and, more particularly, to methods and apparatus for combining digital streams of video and graphics for presentation on an output display.

2. History of the Prior Art

There have been various attempts to combine video data (data used to display television) and graphics data (data used to provide a computer display) for presentation on an output display. Most of these attempts have been directed to providing television programs in a window on a computer screen.

Only a few attempts have been made to provide computer graphics output on a television output display. Because the format of the two sources is so different, it has been the practice to import the video signals into computer memory, change the various signals to the format utilized on the chosen output display, combine the signals, and transfer the data to the output display. In general, this has slowed the presentation of all data on the output display because of the large amount of bus time occupied by the video data.

Moreover, all prior art attempts to combine these two types of data have dealt with analog data presented on an analog output display. At present, digital displays appear to be the choice for the future of both television and computers.

It is desirable to provide a new method and apparatus for combining video and computer graphics data capable of utilizing the most accurate timing signals available to produce displays which accurately present and are capable of differentiating each of the individual streams for presentation on either an analog or a digital output display.

SUMMARY OF THE INVENTION

It is, therefore, an object of the present invention to provide a new system for combining video data and computer graphics data to provide an output display more rapidly and accurately than has been previously possible.

This and other objects of the present invention are realized by a single chip system including a first input channel for receiving digital video input data, a second channel for receiving computer graphics data, means for synchronizing the two channels to one another utilizing timing signals which may be selected to provide the most accurate timing available, means for changing the rate of presentation of the computer graphics signals to match the rate of presentation of the video signals, means for adjusting the format in which the computer graphics signals are presented to the same format as the format in which the video signals are presented, and means for selectively blending the computer graphics and video signals furnished as video input data without modification for presentation on a single output display.

This and other objects and features of the invention will be better understood by reference to the detailed description which follows taken together with the drawings in which like elements are referred to by like designations throughout the several views.

DETAILED DESCRIPTION

Figure 1:
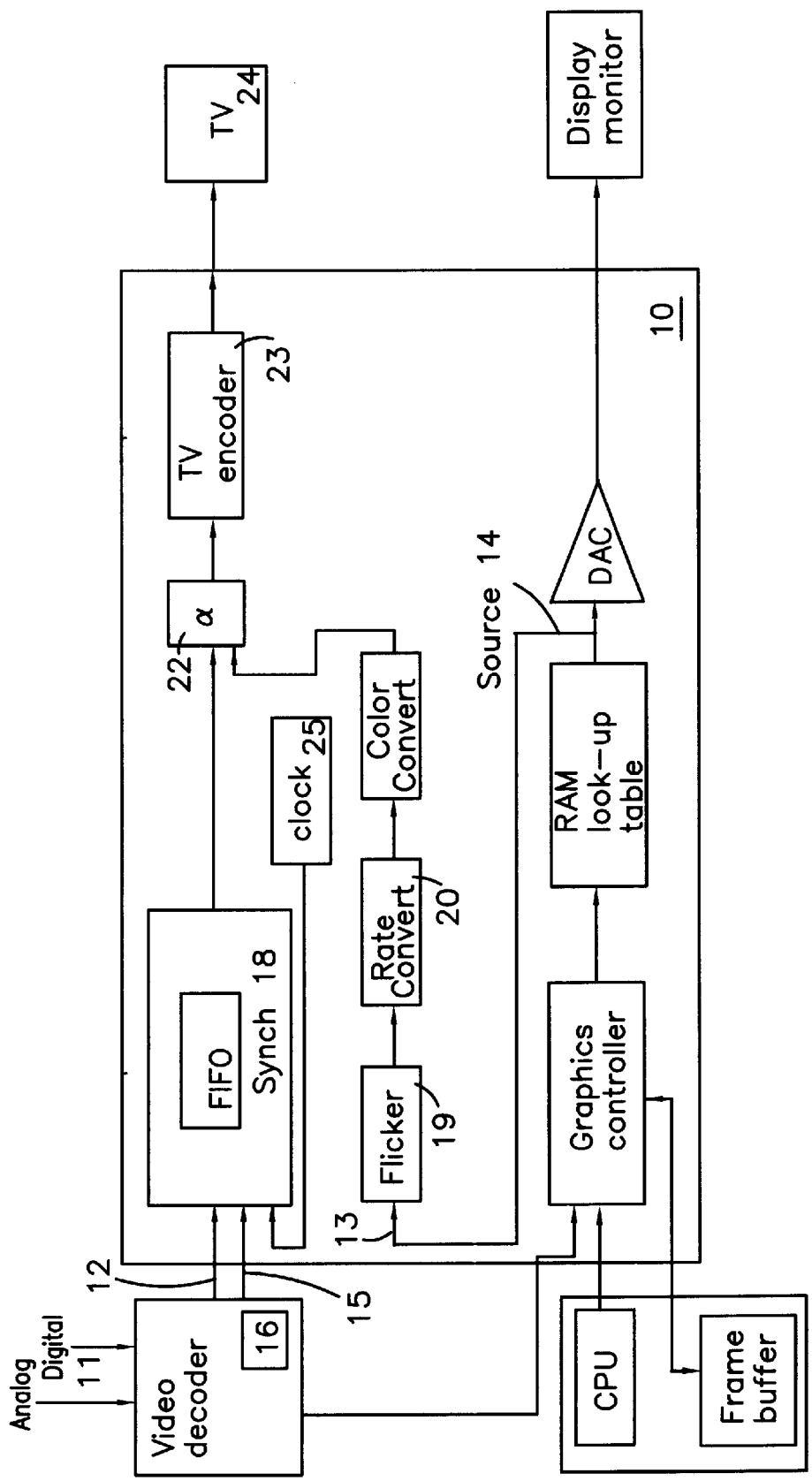
FIG. 1 is a block diagram illustrating the present invention.

FIG. 1 is a block diagram showing the a system 10 designed in accordance with the present invention. The system 10 includes input terminals 11 for receiving digital video signals from a source of digital video signals 12, input terminals 13 for receiving digital computer graphics signals from a source of digital computer graphics signals 14, and input terminal 15 for receiving clock signals from a source of video timing signals 16.

The system 10 also includes a synchronization circuit 18, a flicker control circuit 19, a rate conversion circuit 20 for converting digital computer graphics signals to the format of the digital video input signals, an alpha blending circuit 22 for combining the video and computer graphics input signals, and an encoder circuit 23 for receiving the output provided by the alpha blending circuit and transferring that output to a display 24 for presentation.

Depending on the particular embodiment of the system 10, video signals may be furnished at the input terminals 11 by circuitry such as DVD player, a high definition television receiver, a camcorder, a VCR, or similar circuitry the elements of which are well known to those skilled in the art. Typically these signals are furnished as composite signals including both the data defining pixel positions and the horizontal and vertical synchronization signals defining the beginnings of lines and frames. External clock signals may similarly be provided at the terminal 15 from those video sources (e.g., DVD player, high definition television receiver, camcorder) which typically provide very precise timing signals.

It is one feature of this invention that the external clock signals may be utilized for synchronization and other timing purposes if the external clock signals are more accurate than any internal timing signal, while an internal timing signal generated by a source 25 may be utilized if the external clock signals are not sufficiently accurate. In most cases, the external clock signals furnished by some other less accurate source of timing signals such as a VCR would not be utilized by the system 10.

Typically, the external source of computer graphics signals is the output of a computer graphics device furnishing computer graphics signals in a digital red/green/blue format. The particular source might be the frame buffer memory of a locally-positioned computer or some other source of computer graphics signals such as a lookup table which receives index values stored in a frame buffer. The source may provide the data in any of the forms in which it typically appears such as any of the common pixel formats.

As is known to those skilled in the art, television signals are typically furnished in interlaced format in which every other line to be displayed on an output display is furnished to define a first frame and the intervening lines are furnished to define a second frame. By furnishing first one frame and then a second frame the motion typical to a television display is smoothly presented. The format of a television display is typically presented 29.97 interlaced frames (totaling 59.94 frames) per second in NTSC format (the frame rate differs in other formats such as PAL). The format of a television display typically represents each pixel in YUV format with a variable number of bits per pixel for each element represented.

Graphics signals, on the other hand, are usually furnished in a non-interlaced format at sixty frames per second. In a non-interlaced format, each frame includes all of the horizontal lines which define the display. Graphics data may be represented in any of a number of different formats including for example, one, two, four, eight, sixteen, twenty-four, or thirty-two bits per pixel. In most of these formats, the bits are divided into groups representing red, green, and blue colors. A pixel in these formats often include bits which may be utilized to provide other data such as alpha blending data. For example, a sixteen bit format often utilizes five bits for each of the three colors and one bit for alpha blending purposes.

As is understood by those skilled in the art, the differences in interlaced and non-interlaced formats and the frame rates at which they appear require that one of the input signal streams be modified to be similar to the other input signal stream when the signals are to be presented on the same television display. In addition, the difference in the YUV and RGB formats require that the color determinations be changed to be the same. If the two data streams are to be presented on a television display, then both signal streams should be presented in YUV format. Moreover, the different bit formats used to represent the television signals and the graphics data must be made the same in order to be correctly represented on the television display.

All of these problems must be overcome in order for the two different signal streams to be presented on the same television display. In addition, there are any number of other problems which must be overcome in order to correctly represent both signal streams on the same television display.

One important characteristic of the present invention which should be especially noted is that the digital video signal stream is transferred into the system 10 and synchronized with the graphics data stream by the synchronization circuitry 18 but is otherwise presented without modification to the blending circuitry 22 for transfer to the output display. By sending the video signals directly to the display circuitry without modification other than alpha blending, the bandwidth required by prior art arrangements to send video signals to computer memory and retrieve those signals from memory is eliminated; and the operation is greatly accelerated.

Moreover, sending the video signal directly through the system without modification allows the video clock signal to be utilized to synchronize the two streams of data. The video signal and its clock are simultaneously presented to the system 10 in the present invention, while the video signal was stored in memory in prior art arrangements. Because the video signal has been stored in memory disassociated from its clock, synchronization required the use of an internal system clock.

To accomplish the synchronization conveniently in the present invention, a large first-in/first-out (FIFO) buffer is provided into which the stream of video data is placed. Although it is not necessary to the invention, it is presumed that the video data received is combined with the horizontal and vertical synchronization signals. The large FIFO buffer allows the video signal to be appropriately synchronized with the graphics signals provided by providing essentially an entire horizontal line of video data with horizontal and vertical synchronization signals of the two streams of signals may be locked together. Once the clock has been chosen for synchronizing the streams, this clock is utilized as the internal clock for the system 10. The clock chosen then is used to determine the appropriate intervals between horizontal and vertical synchronization signals of each of the data input streams. The clock is essentially divided by the number of pixels in a horizontal scan plus pixels in the horizontal blanking interval to determine the horizontal synchronization interval and by the pixels in a frame including horizontal synchronization intervals plus the pixels in the vertical blanking interval to determine the vertical synchronization interval.

Figure 3:
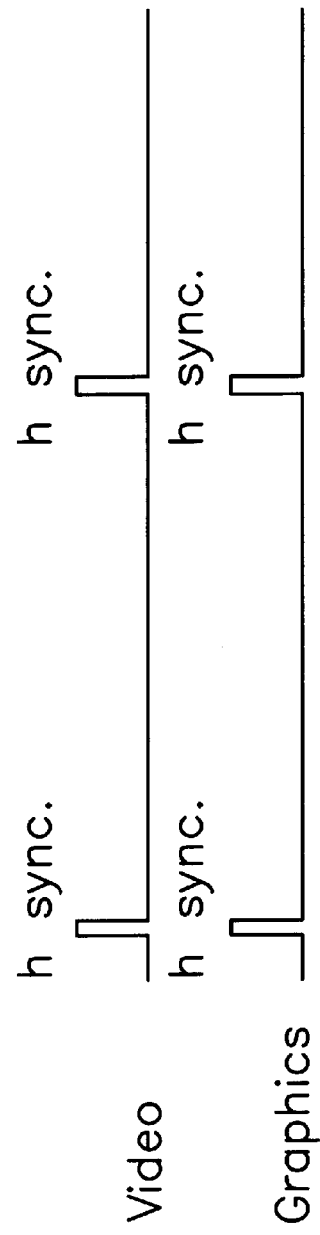
FIG. 3 is a more detailed illustration of the operation of one portion of the invention illustrated in FIG. 1.

As pointed out, graphics data is typically furnished in non-interlaced form at a rate of 60 frames per second while video data is furnished in interlaced form at a rate of 29.97 frames (59.94 interlaced frames) per second. The television display accepts the interlaced form at 29.97 frames per second. Consequently, the graphics data must be placed in this format. Synchronizing the two streams of data together in the circuit 18 by utilizing the same clock for each adjusts the frame display rate to the correct 29.97 frames per second utilized by the television display. With the frame rate the same, the horizontal and vertical synchronization signals of each of the two streams of data which are used to determine the beginning of each horizontal and vertical sweep of the display are caused to occur together as is shown in FIG. 3.

Figure 2:
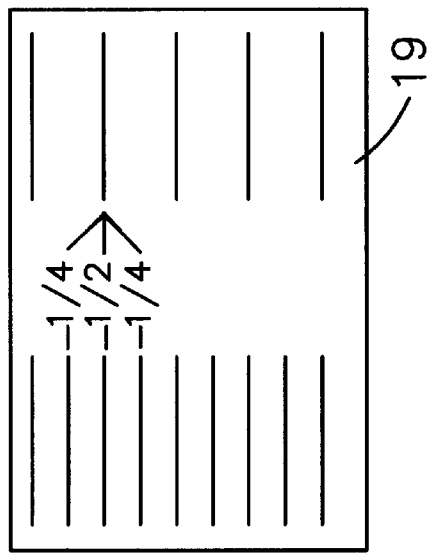
FIG. 2 is a more detailed illustration of one embodiment of one portion of the invention illustrated in FIG. 1.

The alpha blending circuitry receives the video and graphics signals and combines those signals in accordance with an alpha input signal typically in accordance with an algorithm such as that illustrated in FIG. 2. The alpha input signal may be furnished by any of a number of possible sources. For example, the alpha value may be a constant value. Alternatively, the graphics data may include an alpha value as a part of the data by which the graphics pixel data is furnished. Various other sources of alpha data may also be furnished to accomplish other purposes.

The alpha value is utilized to blend together the video and graphics signal streams. Typically, one of the streams is multiplied by the alpha value which may vary from 0 to 1; while the other stream is multiplied by 1 minus the alpha value. This may be accomplished in accordance with the present invention on an overall or on a pixel by pixel basis. For example, if a constant value of alpha is furnished to the alpha blending circuitry, then the amount of each stream will be constant. If on the other hand, an alpha value furnished with the graphics pixel data is utilized, the alpha may vary with each pixel received.

In order to adjust the graphics data stream for display on a television display, the graphics stream is furnished to a flicker control circuit 19 and a rate control circuit 20 which together divide the graphics data into the two frames necessary to provide images on a television display. Since the normal interlaced images which make up every other horizontal line on the output display are furnished to a television display separated in time, the images furnished by the two interlaced frames are slightly different from one another whenever motion is involved. If non-interlaced graphics frames are simply divided into two sequential frames consisting of all odd numbered horizontal lines and all even numbered horizontal lines, then the resulting interlaced frames will not have the correct time difference; and the output image will appear to flicker.

Figure 4:
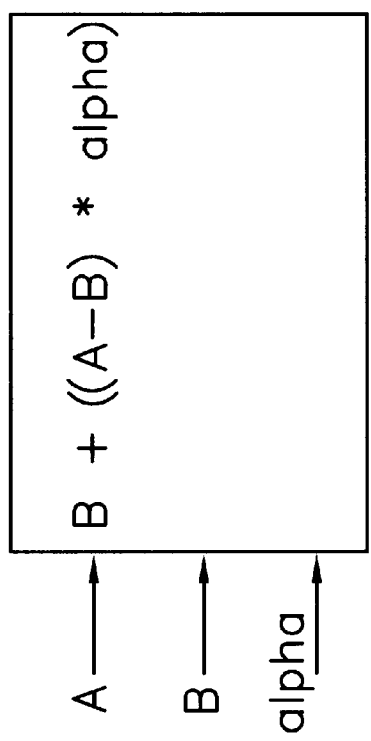
FIG. 4 is a more detailed illustration of one embodiment of yet another portion of the invention illustrated in FIG. 1.

The flicker control circuit removes this flicker using one of a number of techniques known to the prior art. For example, the flicker control circuit 19 may generate each of the horizontal lines of each interlaced frame by combining portions from each of the lines to be displayed and lines immediately before and after those lines as is illustrated in FIG. 4. The amounts of each line which are included vary with the particular technique. However, each technique tends to smooth the differences between lines and remove the flicker effect.

Once flicker has been removed by the flicker control circuit 19, the graphics data stream is transferred to the rate control circuit 20 in which the alternate lines of the graphics frame are selected for inclusion in the two successive frames which make up the total interlaced display. The resulting graphics output is then in the same form and appears at the same rate as the video signal stream to which it is synchronized.

At this point, the two streams are such that they could be combined except that the video stream indicates its color and data information in YUV format, while the graphics stream utilizes RGB coding to indicate that type of information. Since a television display responds to YUV information, the graphics data stream is transferred to a color control circuit which utilizes well known algorithms to transfer the RGB color information into YUV information.

The two streams of information are then transferred to the alpha blending circuit 22. At the alpha blending circuit, the two streams of information are blended in the manner described above. The resulting stream of information is transferred to a television encoding circuit 23 which functions in a manner well known to those skilled in the art to prepare the stream for display on a television output display. Although at the present time, most television displays are analog displays, in the near future the display will probably be an HDTV display. For that reason the system may be provided with either or both types of output circuitry.

The system of the present invention also includes as a part of the single chip an arrangement for providing output to a computer display monitor.

This allows the particular chip to be utilized to provide output signals for a computer monitor as well as a television display. Moreover, in the embodiment shown in FIG. 1, portions of the associated computer such as a graphics controller are provided as a part of the single chip in order to eliminate redundancy and reduce overall expense.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A single chip system for combining digital video and graphics streams of data for display on a television output display comprising:

a first input channel for receiving digital video input data, a second input channel for receiving computer graphics data, means for synchronizing the two channels to one another comprising:
   means for utilizing a timing signal to determine horizontal and vertical synchronization intervals for each of the channels, and
   means for locking the horizontal and vertical signals for each channel together, means for adjusting the format in which the computer graphics signals are presented to the same format as the format in which the video signals are presented comprising:
   means for equalizing the difference between horizontal lines in a frame of computer graphics display, and
   means for dividing each frame of the computer graphics signals into a pair of successive frames, and means for selectively blending the adjusted computer graphics and unmodified video signals furnished as video input data for presentation on a single output display.

* * * * *